US012587544B2

(12) United States Patent
Balazs et al.

(10) Patent No.: US 12,587,544 B2
(45) Date of Patent: Mar. 24, 2026

(54) METHOD AND SYSTEM TO REMEDIATE A SECURITY ISSUE

(71) Applicant: Atos UK International IT Services Limited, London (GB)

(72) Inventors: Madalina Balazs, Timis (RO); Amarjit Matharu, Solihull (GB)

(73) Assignee: BULL SAS, Les Clayes Sous Bois (FR)

( * ) Notice: Subject to any disclaimer, the term of this patent is extended or adjusted under 35 U.S.C. 154(b) by 222 days.

(21) Appl. No.: 17/494,972

(22) Filed: Oct. 6, 2021

(65) Prior Publication Data

US 2022/0109682 A1 Apr. 7, 2022

(30) Foreign Application Priority Data

Oct. 6, 2020 (EP) ..................................... 20200388

(51) Int. Cl.
H04L 9/40 (2022.01)

(52) U.S. Cl.
CPC ...... H04L 63/1416 (2013.01); H04L 63/1425 (2013.01); H04L 63/145 (2013.01); H04L 63/20 (2013.01)

(58) Field of Classification Search
CPC ............. H04L 63/1416; H04L 63/1425; H04L 63/145; H04L 63/20; G06F 2221/2115; G06F 21/552; G06F 21/554
See application file for complete search history.

(56) References Cited

U.S. PATENT DOCUMENTS 9,069,930 B1 6/2015 Hart
9,235,704 B2 1/2016 Wootton et al.

| | | | | |
|---|---|---|---|---|
| 10,873,596 | B1 * | 12/2020 | Bourget | .................. H04L 51/02 |
| 11,057,409 | B1 * | 7/2021 | Bisht | ................... H04L 63/1441 |
| 11,550,652 | B1 * | 1/2023 | Arora | .................. G06F 11/3442 |
| 2015/0052614 | A1 * | 2/2015 | Crowell | .................. G06F 21/53 |
| | | | | 726/25 |
| 2015/0371347 | A1 * | 12/2015 | Hayward | ............... G16H 10/20 |
| | | | | 705/314 |
| 2017/0063899 | A1 * | 3/2017 | Muddu | ................... H04L 43/00 |
| 2017/0318050 | A1 | 11/2017 | Hassanzadeh et al. | |
| 2018/0211042 | A1 * | 7/2018 | Reinecke | ............. G06F 21/568 |

(Continued)

FOREIGN PATENT DOCUMENTS

WO 2011063269 5/2011

OTHER PUBLICATIONS

European Search Report issued in EP20200388.5 on Mar. 10, 2021 (10 pages).

*Primary Examiner* — Alexander Lagor
*Assistant Examiner* — Rupali Dhakad
(74) *Attorney, Agent, or Firm* — ARC IP Law, PC; Joseph J. Mayo

(57) ABSTRACT

A method performed by a security engine system to remediate a security issue of a computing resource. A transformation module may determine a security event from a description of the security issue, and a main message broker may send the security event to a decision server to obtain a sequence of recommended remediation actions based on the security event. A remediation server may then execute remediation scripts, each remediation script implementing at least a remediation action from the sequence of recommended remediation actions, each remediation action being applied to the computing resource.

8 Claims, 2 Drawing Sheets

(56) References Cited

U.S. PATENT DOCUMENTS

| | | | |
|---|---|---|---|
| 2019/0318100 A1* | 10/2019 | Bhatia | G06F 21/57 |
| 2019/0379704 A1* | 12/2019 | Murphy | G06F 21/561 |
| 2020/0089561 A1* | 3/2020 | Laing | G06F 11/0727 |
| 2020/0241953 A1* | 7/2020 | Ali | G06F 11/0787 |
| 2020/0322359 A1* | 10/2020 | Burns | H04L 63/1416 |
| 2021/0306352 A1* | 9/2021 | Narula | G06N 5/04 |
| 2022/0277075 A1* | 9/2022 | Cummings | H04L 67/51 |

* cited by examiner

METHOD AND SYSTEM TO REMEDIATE A SECURITY ISSUE

This application claims priority to European Patent Application Number EP20200388.5, filed Oct. 6, 2020, the specification of which is hereby incorporated herein by reference.

BACKGROUND

Field of the Invention

The technical field is security of computing resources such as cloud resources.

Description of the Related Art

Cloud providers such as Google Cloud™, Amazon Web Service™ or Azure™ provide native security solutions developed by them, also called security findings hubs, to help customers gain visibility of cloud resources and their security state in a way to simplify and improve security management of cloud resources. Security findings hubs integrate with detection capabilities that scan a customer environment and detect vulnerabilities and potential security issues such as misconfigurations. Detection capabilities can leverage machine learning, threat intelligence, ingress/egress visibility, and other telemetry. The detected security issues are then reported centrally into the security findings hub, providing a view across the entire customer environment. However, security findings hubs do not presently provide a means to remediate these security issues easily and can be difficult to manage large volumes of findings resulting in unsorted and unprioritized security issues. This can lead to large amount of time between detection and remediation of security issues.

A security orchestration, automation, and response system is a third-party solution covering at least a part of the remediation process, from generating a remediation strategy to applying remediation actions directly to the cloud resource. A security orchestration, automation, and response system can reduce the time between detection and remediation of security issues. However, not all security orchestration, automation, and response system provide direct application programming interface (hereafter called API) integration with security findings hubs.

There is a need to provide a security solution offering remediation of security issues without any input from a user, that can integrate a security orchestration, automation, and response system to the cloud environment.

BRIEF SUMMARY OF THE INVENTION

According to a first aspect of the invention, this need is satisfied by providing a method to remediate a security issue of a computing resource, the method being carried out by a security engine system comprising a transformation module, a main message broker, and a remediation server, the security engine system being configured to communicate with the computing resource and a decision server, the method comprising the following steps:

> determining, using the transformation module, a security event from a description of the security issue;
> sending, to the decision server by the main message broker, the security event to a decision server to obtain a sequence of recommended remediation actions based on the security event;

> receiving, from the decision server by the main message broker, the sequence of recommended remediation actions;
> executing, using the remediation server, remediation scripts, each remediation script implementing at least a remediation action from the sequence of recommended remediation actions, each remediation action being applied to the computing resource.

Thanks to the invention, information related to the security issue are automatically sent to the decision server to get a sequence of remediation actions. Without any input from a user, the remediation actions are applied to the computing resource. This way, a detected security issue is automatically remediated as soon as possible, reducing the delay between the detection and the remediation.

The security event provides an abstraction layer to the description of the security issue, the said abstraction layer providing a universal means to exchange information between the computing resource and the decision server. The decision server does not need to natively support the API of the computing resource. The term universal has to be taken as agreed at the organization level.

The abstraction layer provided by the security event allows to exchange information between the computing resource and the decision server, whether the computing resource is public, private, or hybrid (public/private). This way, remediation process can be extended and is not limited to public computing resources.

Executing remediation scripts not provided by the decision server allows the users to control remediation actions performed on the computing resources. For example, the users can create their own remediation scripts instead of using third-party solutions directly interacting on the cloud resource.

Separating the decision making and the remediation action execution allows for greater flexibility for developing new use cases. It also reduces the technology dependence that further reduces risks of vendor lock.

A decision server may be isolated from the cloud resource to increase security. For example, stakeholders can request a layer of separation between the cloud resource and the decision server. The method of one or more embodiments of the invention provides a way to link the cloud resource to the decision server as it sends the security event to the decision server and receives information from the decision server.

The decision server, isolated from the cloud resource, cannot directly perform operations into the cloud environment (as applying remediation actions). The method applies remediation actions instead of the decision server.

The security engine system between decision server and cloud resource allows to track all security issue detections and remediations. It ensures that the lifecycle of the security events is maintained consistently. It can also ensure that stakeholders can be notified each time an action is taken.

Despite the characteristics recited above, the method according to the first aspect may also have one or more additional characteristics considered individually or by any technically possible combinations thereof.

According to an implementation, the security event is determined from a description of the security issue and associated context information. Context information associated to the security issue provided to the security event offers a better analysis of the security issue to get sequence of remediation actions fitting the remediation needs.

According to another implementation of the method, the sequence of recommended remediation actions is added to the security event.

According to another implementation of the method, the main message broker also receives an investigation result from the decision server based on the security event, the investigation result indicating if the security issue is considered as a true positive or a false positive. Preferentially, remediation scripts are only executed by the remediation server when the investigation result indicates a true positive.

According to another implementation of the method, the security event comprises one or more security marks, at least one security mark corresponding to the state of the said security event, at least one new security mark being added to the plurality of security marks at each steps of the method.

Security mark is taken to mean label or tag.

Security marks help to maintain an auditable lifecycle of the security event.

Findings hubs do not provide advanced reporting that could benefit a security operations team. Therefore, there is a need to provide a solution offering advanced reporting of security state of the cloud resource.

According to another implementation of the method, the security engine system comprises a database, the security event comprises metadata and the method comprises a step of storing the metadata of the security event in the database. Preferably, the method comprises a step of sending at least a part of the metadata of the security events stored in the database to the decision server. The result of the said analysis can be compiled in a report, the report can be sent to stakeholder such as a security operation team.

According to another implementation of the method, the security engine system comprises a notification server and the method comprises a step of sending a notification by electronic messaging using the notification server.

Another aspect of the invention relates to a security engine system to remediate a security issue of a computing resource, the security engine being configured to carry out the previously mentioned method.

Another aspect of the invention relates to a computer program product comprising instructions which, when the program is executed by a computer, causes the computer to carry out the method according to one or more embodiments of the invention.

Another aspect of the invention relates to a computer-readable medium comprising instructions which, when executed by a computer, cause the computer to carry out the method according to one or more embodiments of the invention.

BRIEF DESCRIPTION OF THE DRAWINGS

The invention and the advantages will become clear from the figures and the description given thereof below, by way of indication and in no way limiting, with reference to the appended figures, among which.

For greater clarity, identical or similar elements are marked by identical reference signs in all the figures.

DETAILED DESCRIPTION OF THE INVENTION

Figure 1:
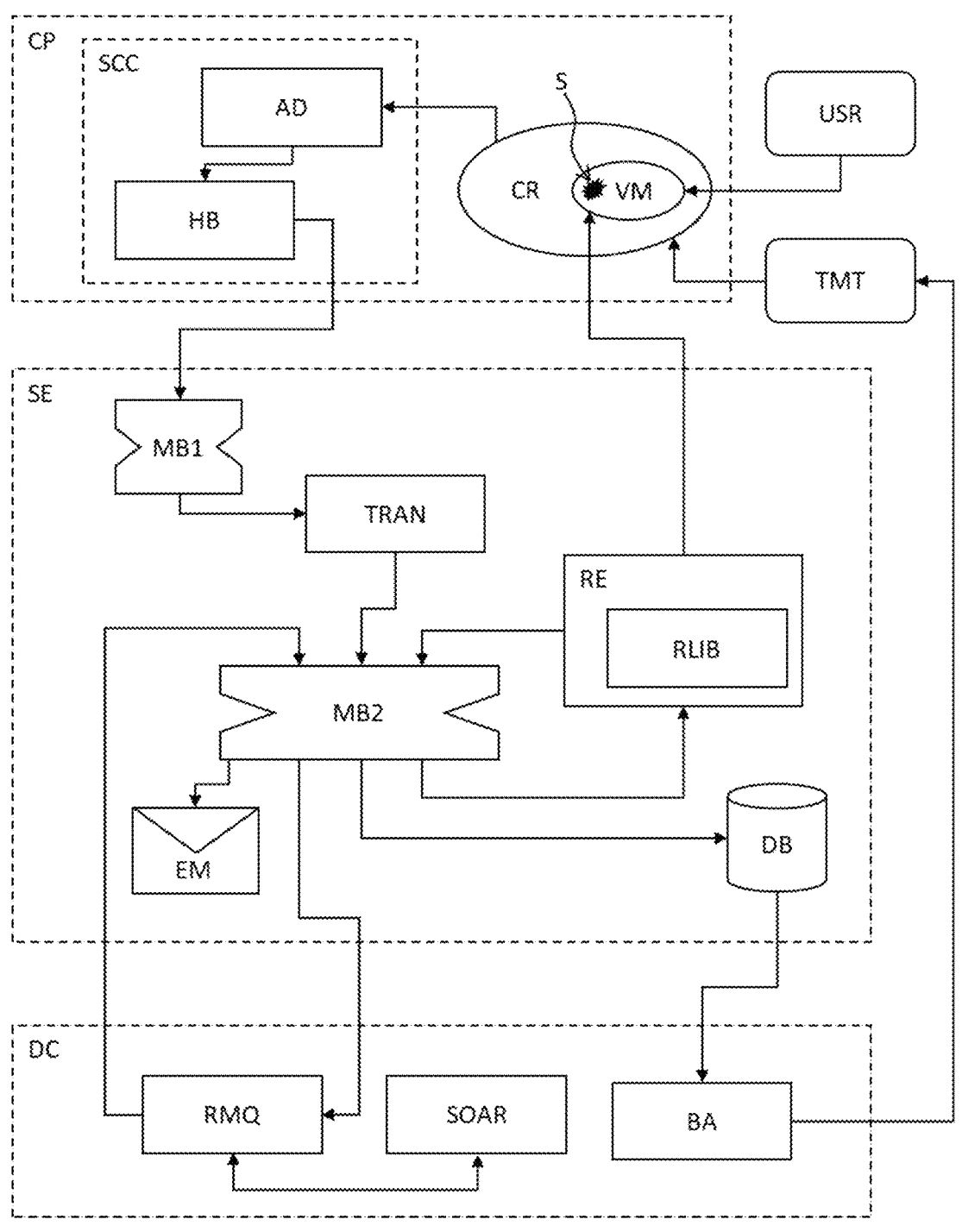
FIG. 1 shows an embodiment of a security engine system.
Figure 2:
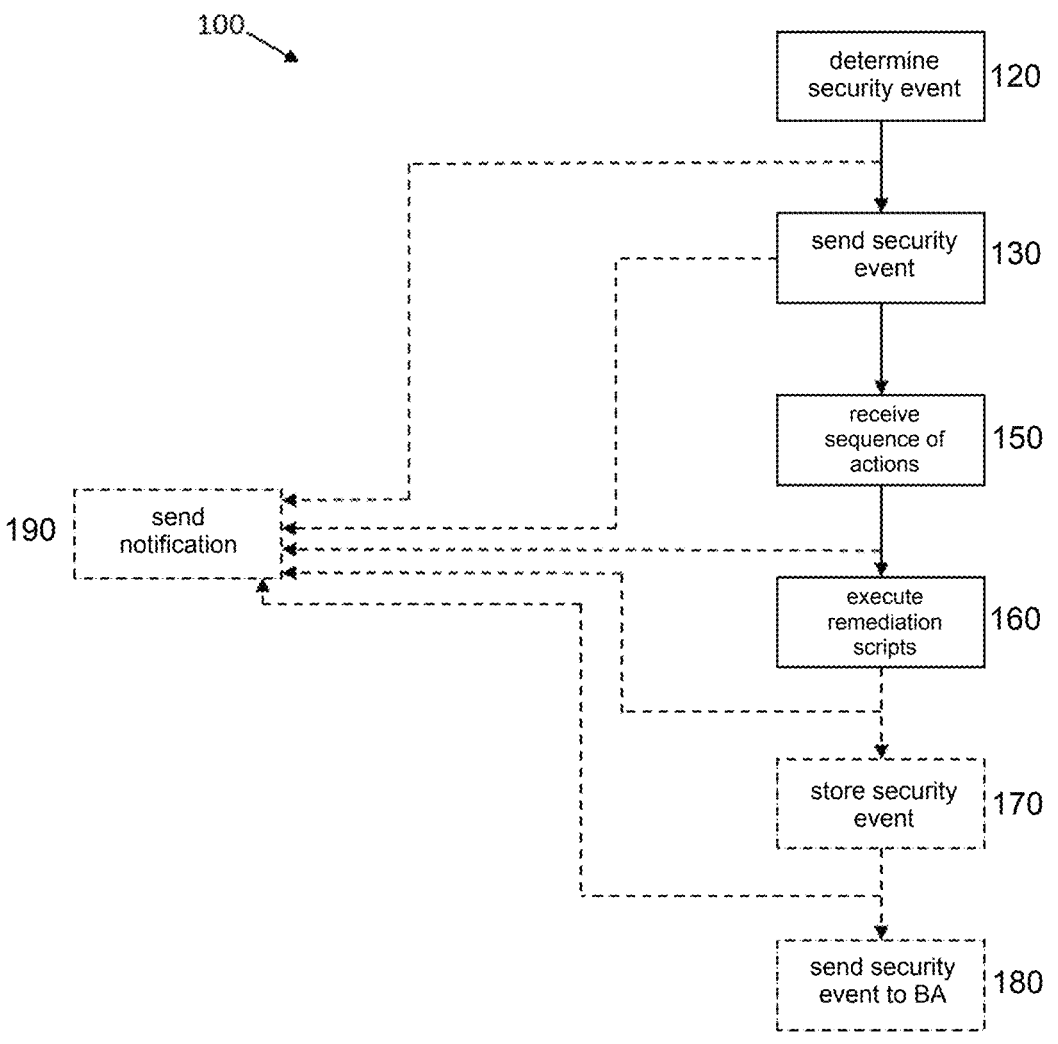
FIG. 2 shows an implementation of a method to remediate a security issue.

A first aspect of the invention illustrated in FIG. 1 and FIG. 2 concerns a method 100 to remediate a security issue S of a computing resource CR.

The computing resource CR can be part of a computing platform CP comprising a server or a cloud platform, provided by a cloud provider such as Google Cloud Platform™, Amazon Web Services™ or Microsoft Azure™. The computing resource CR can be a server or a cloud server comprising at least a processor and memory. At least a part of the computing resource CR is accessible by a user USR. In the example of the FIG. 1, the user USR is running a virtual machine VM on a part of the computing resource CR. The virtual machine VM comprises a security issue S, offering a way to undesired software to run on the virtual machine VM, taking advantage of computing resources or sensitive information. Of course, the virtual machine VM may comprise a plurality of security issues S. As an example, the security issue S can be a malicious crypto mining software running on the virtual machine VM of the user USR. The crypto mining software can be detected because of the large amount of processor resources it uses or because of an unusual data stream sent to an untrusted external resource. The crypto mining software is detected by a security findings hub.

The computing resource CR can be public or private. A public computing resource CR is shared between a plurality of users USR. The term user USR can refer to a person or an organization. Computing resources CR can be adjusted to match needs between the users USR or organization. The information of a user USR, or at least the sensitive information of a user USR, is not shared with other users USR. However, if a security issue S occurs, Information may be compromised. A private computing resource CR is dedicated to one user USR or one organization. A hybrid computing resource comprises public and private computing resources.

The security management of the computing resource CR can be done by a dedicated threat management team TMT. However, depending of the size of the organization using the computing resource CR, the threat management team can comprise only one person and, in some cases, the said one person is also the user USR of the computing resource CR. Stakeholders are defined as the threat management team TMT and the user USR.

The method 100 of one or more embodiments of the invention is intended to remediate the security issue S and can be implement by a security engine system SE comprising a transformation module TRAN, a main message broker MB2; and a remediation server RE. The security engine system can communicate with a decision server DC. The decision server DC provides recommended remediation actions to remediate the security issue S.

In order to do so, the method of one or more embodiments of the invention comprises a step of determining 120 a security event from a description of the security issue S. The description of the security issue S is also called a finding. The determination 120 is performed by the transformation module TRAN. The determination 120 allows to convert the description of the security issue S in a format processable by the decision server DC.

In an embodiment, the security engine system SE is connected to a findings hub SCC belonging to the computing platform, and the finding received by the transformation module TRAN is sent by the findings hub SCC. The findings hub SCC can be a native security solution provided by the computing providers to manage the security of the computing resource CR. The findings hub SCC can be a third-party security solution installed on the computing platform CP, offering security management features equivalent to one offered by providers of computing resources. Public computing providers usually provide a findings hub SCC, however private computing providers can also provide similar solution. The findings hub SCC can give a detailed overview of the security state of the computing resource CR. The security issue S of the computing resource CR is detected and stored by the findings hub SCC. To do so, the findings hub SCC comprises an anomaly detection service AD, and a security hub HB.

The anomaly detection service AD is configured to scan the computing resource CR and detect the security issues S. The anomaly detection service AD can leverage threat intelligence to detect security issues S, for example, involving multiple machine learning algorithms. The anomaly detection service AD can also monitor telemetry as ingress/egress to the computing resource CR to detect application or resource exhibiting unexpected use of computing resources. The anomaly detection service AD compiles a description of the security issue S also called finding. For example, the anomaly detection service AD can be a Google Cloud Anomaly Detection™ or an Amazon CloudWatch Anomaly Detection™.

The finding can be stored on the security hub HB. The security hub HB is a central element that the thread management team TMT can access to obtain a list of all the findings. The security hub can offer a graphical user interface, such as a dashboard, listing the findings.

In an embodiment, the finding corresponding to the security issue S is directly received by the transformation module TRAN. For example, the security engine system SE is connected to a findings hub SCC belonging to the computing platform CP, and the finding received by the transformation module TRAN is sent directly by the findings hub SCC to the transformation module TRAN In another embodiment, the security engine system SE comprises a front message broker MB1, configured to transfer the findings from the findings hub SCC to the transformation module TRAN. The front message broker MB1 can receive the finding, from the findings hub SCC. The front message broker MB1 can be replaced by a queuing message server, or a message bus, and the finding are transferred directly to the transformation module TRAN.

In an embodiment, the front message broker MB1 implements the publish-subscribe pattern, also called pub-sub. Following the publish-subscribe pattern, a message generated by a sender, also called publisher, is pushed to a message broker on a defined topic. The message broker then sends the message to one or more services subscribed to the said topic, the services being also called subscribers. The publish-subscribe pattern allows to transfer messages from a plurality of publishers to a plurality of subscribers, routing each message to the right subscriber thanks to the message broker topics.

Thanks to the publish-subscribe pattern implemented by the front message broker MB1, the security engine system SE can receive findings from a plurality of findings hub SCC, therefore from a plurality of computing platform CP. Thus, the front message broker MB1 allows the security engine system SE to remediate security issues S on more than one computing resources CR. This way, the security engine system SE can also remediate security issues S from public computing resources, or private computing resources, or from a hybrid configuration mixing public and private computing resources.

The application programming interface (hereafter called API) from the computing resource CR and more specifically from the findings hub SCC can be implemented to send the findings to the front message broker MB1. It is preferable that the front message broker MB1 has only one topic, this way, all the findings are routed to the single subscriber of the front message broker MB1. Preferably, the single subscriber of the front message broker MB1 is the transformation module TRAN to which all findings are sent.

The determination 120 of the security event is performed based on said findings. Determining a security event can be defined as converting and/or embedding the received finding. Security event provides an abstraction layer to the findings facilitating the interoperability of the underlying finding. Preferentially, the security event format and the finding format are agreed at organization level so that the security event and the underlying finding can be processed on the decision server DC side. This way, it ensures that the security event will have the same format every time.

The finding may be embedded in the security event in its original form. However, a conversion of the finding can be performed to provide processable information to the decision server DC. The finding can be an organized text to allow an easy parsing and a good interoperability. For example, it can be formatted using the JSON format. An example of a security event in a JSON format can be found below.

```
{
    "security_event": {
        "finding": {
            "name": "finding1",
            "source": "findinghub1",
            "state": "issue",
            "category": "high",
            "action_taken": "None",
            "finding_type": "crypto mining service",
            "summary_message": "Crypto mining service running on a virtual machine
                    streaming data to external URL.",
            "URLs": "https://malicious.org/malicious",
            "virtual_machine_ip": "cloud.organization.org",
            "virtual_machine_hostnames": [ "user1" ],
            "creation_datetime": "2020-04-28T11:43:26"
        },
        "security_marks": [
            { "status": "investigated" },
            { "creation_timestamp": "2020-04-28T11:43:26" },
            { "investigation_timestamp": "2020-04-28T11:45:02" }
        ],
        "context": {
            "time_received": "2020-04-28T11:43:27",
            "resource_owners": [ "email@domain.net" ],
            "id": "1A2B3C4D5E6F",
```

-continued

```
        "type": "org.organization.security.response",
        "subject": "scc-event",
        "version": "0.1",
        "source": "scc//gcp/6f5e4d3c2b1a",
        "datacontenttype": "application/json"
    },
    "response": {
        "investigation_result": "true-positive",
        "remediation": [
            { "action": "snapshot_disk" },
            { "action": "stop_instance" }
        ]
    }
  }
}
```

In the above example, the security event comprises a finding, security marks, context information and response to remediate the security issue S. It further comprises a plurality of fields, for example the fields "finding type", "URLs", "virtual_machine_ip" and "virtual_machine_hostnames" which provide information on the type of security issue S. During a conversion, the finding is parsed to fill in the fields of the security event.

It can also comprise context information associated to the said security issue S. Context information allows to classify and identify the security event to be correctly processed. Context information can also be used to provide more insight to the decision center DC. As shown in the security event example above, context information can comprise details of the resource owner extracted from a user management system, the source of the finding when there is more than one findings hub SCC, or a unique identification number. Details of the resource owner can be obtained thanks to the findings hub SCC. Context information can also comprise organization or business-related information. For example, it can comprise a list of projects threated, or a boolean if sensitive information is compromised.

Context information can provide information covering wider field than just information related to security issues S and the cloud resources CR. It can comprise information on the decision server DC. For example, the security engine system SE can communicate to more than one decision server DC. Context information can be used to select one of the decision servers DC. In another example, the decision server DC can be disconnected from the security engine system SE because of maintenance. Following this example, the security event cannot be sent to the decision server DC for investigation and an electronic message is sent to stakeholders (a threat management team TMT and/or the user USR).

In an embodiment, a security event comprises one or more security marks. The security marks, for example up to ten, can be added, modified, or removed to the security event at each step of the method. At least one security mark can correspond to the state of the security event. Security marks can provide an overview of the lifetime of a security event. For example, a security event can comprise a security mark "status" set to "remediated" if the associated security issue S is already remediated. A security mark "remediation_timestamp" can comprise a timestamp when remediation actions were performed. Security marks can be used in queries, allowing easy filtering and sorting, for example, to provide an overview of the security status of the computing resource CR. Filtering and sorting using security marks can also help to create reports for the threat management team TMT. More examples of security marks are:

"email_timestamp";

"event_timestamp";

"remediation_timestamp";

"status"; or

"universal_unique_indentifier".

The method 100 comprises a step of sending 130 the security event to the decision server DC to obtain a sequence of recommended remediation actions based on the security event. The security event is sent to the decision server DC by the main message broker MB2.

The security engine system SE may be configured to implement an event driven architecture. Security issues S cannot be predicted, and event driven architecture offers tools to trigger actions as an issue S occurs. An event driven architecture can be provided by the main message broker MB2. In the embodiment of the FIG. 1, the security event is sent by the transformation module TRAN to the main message broker MB2. The main message broker MB2, as the front message broker MB1, can also implements the publish-subscribe pattern. Publishers of the main message broker MB2 may be the transformation module TRAN and the decision server DC. The subscribers of the main message broker MB2 can be the remediation server RE and the decision server DC. In an embodiment of the security engine system SE, subscribers can comprise a notification server EM and a database DB. The main message broker MB2 can route the security event within the security engine system SE and between the security event SE and the decision server DC. The targeted topic on which the security event is pushed can correspond to one or more security marks, for example the last security mark added to the security event. In another example, the security event coming from the transformation module TRAN can have the security mark "status" set as "new". A topic "status new" of the main message broker MB2 can route the security event to the decision server DC. In another example, the security event can have the security mark "status" set to "remediated". The topic "remediated" of the main message broker MB2 can route the security event to the database DB for storage or to the notification server EM in order to inform by electronic messaging the threat management team TMT and/or the user USR that the security issue S has been remediated.

For example, the front and main message brokers MB1, MB2 can be chosen from Google Cloud Pub/Sub™, Azure Service Bus Messaging™, Amazon Simple Notification Servicer™, or Libpubsub-cpp™.

The publish-subscribe pattern can handle many messages to be routed from different publishers to different subscribers. So, when the main message broker MB2 implements the publish-subscribe pattern, a plurality of security events can be processed at the same time, decreasing the remediation time of security issues S.

The decision server DC can be located apart from the security engine system SE, for example in a data center, and only accessible through a network. To generate the sequence of recommended remediation actions based on the security event, the decision server DC can implement prescriptive security. The decision server DC can perform further enrichment, on-premises investigation, and analyze the security event, possibly considering the context information. Based, for example, on an analysis of the security event, the decision server DC determines the sequence of recommended remediation actions. Applying the whole sequence of the suggested actions to the computing resource CR can remediate the security issue S.

Following an implementation of the method 100, the decision server DC can also generate an investigation result based on the security event. The investigation result indicates if the security issue S is considered as a true positive or as a false positive. If the investigation result indicates a true positive, the security issue S has to be mitigated, so the sequence of recommended remediation actions is generated. If the investigation result indicates a false positive, the sequence of the recommended remediation actions may be empty.

The decision server DC can comprise: a queuing service RMQ configured to implement a message queuing protocol; and a security orchestration automation and response system SOAR.

The sequence of recommended remediation actions and/or the investigation result can be generated from a security playbook. A security playbook is an item comprising use cases or workflows to be executed to investigate the security event and/or remediate the security issue. Security playbooks can be integrated to a security orchestration, automation, and response system SOAR.

In the embodiment of the FIG. 1, the security orchestration automation and response system SOAR is configured to investigate the security events and generate the sequence of recommended remediation actions. In the case an investigation result is assessed to the security event, the supply of this investigation result is also performed by the security orchestration automation and response system SOAR.

The queuing service RMQ is configured to manage the security events coming from the security engine system SE. Each security event is pushed sequentially on the security orchestration automation and response system SOAR and the queuing service RMQ wait for the enriched security event to be sent back from the security orchestration automation and response system SOAR. This way, the security orchestration automation and response system SOAR interface is not directly exposed to the security engine system SE, reducing the need to manage the queuing on the security engine system SE side. The queuing service RMQ can be a RabbitMQ message broker.

The method 100 comprises a step of receiving 150 the sequence of recommended remediation actions from the decision server DC. The sequence of recommended remediation actions is received by the main message broker MB2. When an investigation result is computed, it is also sent by the decision server DC and received 150 by the main message broker MB2. The investigation result is based on the security event and indicates if the security issue S is considered as a true positive or a false positive.

Instead of sending the sequence of recommended remediation actions and/or the investigation result independently, the decision server DC can enrich the security event with the investigation result and/or the sequence of recommended remediation actions. The enriched security event can then be sent back by the decision server DC and received 150 by the security engine system SE. The enriched security event is routed by the main message broker MB2 to the remediation server RE. To reduce data transfer over the network connecting the security engine system SE and the decision server SE, only the recommended remediation actions and/or the investigation result can be sent back by the decision server DC to the message broker MB2. In this case, the security event can be stored until recommended remediation actions and/or the investigation result are received 150. Then recommended remediation actions and/or the investigation result are appended to the security event before to be routed to the remediation server RE.

The method 100 comprise a step of executing 160 remediation scripts. Each remediation script implements a remediation action from the sequence of recommended remediation actions, each remediation action being applied to the computing resource CR. The remediation server RE can be triggered when it receives a security event comprising a sequence of recommended remediation actions.

The remediation server RE can comprise a script library RLIB that the remediation server RE queries. The script library RLIB comprises remediation scripts or chunks of scripts. A remediation script implements a remediation action to apply to the computing resource CR. For example, a remediation script can implement: doing a disk snapshot to copy an evidence of the threat; or shutting down a virtual machine VM.

Preferably the remediation scripts from the library RLIB can implement all the recommended remediation actions from the security playbook of the decision server DC. This way, the whole sequence of recommended remediation actions can be applied to the computing resource CR and remediate the security issue S. In the case no remediation script can produce a recommended remediation action, a new security mark, for example "missing script", is added to the security event and the security event is sent to the main message broker MB2. A security event comprising a "missing script" security mark can be route to the notification server EM so a warning is sent by electronic messaging to the stakeholders.

When the remediation scripts are executed following the sequence of recommended remediation actions, the security issue S is remediated and a security mark "remediate" can be added to the security event which can be then send back to the main message broker MB2.

Preferably, when no investigation result is received or when the investigation result indicates a true positive, the remediation server RE executes 160 the remediation scripts. When the security event comprises the investigation result indicating a false positive, the remediation server RE may not execute any remediation scripts.

Preferably, the user USR or the threat management team TMT can choose part of the computing resource CR where the remediation actions is not enforced automatically even if the investigation result indicates a true positive. The part may be chosen depending of the criticality of the affected resource.

A security event can be routed by the main message broker MB2 to the database DB to be stored 170. A security event can be routed to the database DB following its security marks. If the security mark comprises "missing script", the security event can be routed to the database DB to be stored 170 for later analysis. If the security mark comprises "remediate", the security event can be routed to the database DB to be stored 170 in order to keep track of the security event lifecycle.

Preferably, only metadata of security events are stored 170 in the database DB. Metadata of security events comprises information of the security events except sensitive information such as personal information of the users USR. Metadata contains, for example, one or more security marks, the investigation result or the sequence of recommended remediation actions generated by the decision server DC. Storing only the security event's metadata frees up the database DB of personal information of the users USR which can be incompatible with territory regulations such as the General Data Protection Regulation or can comprise sensitive information. The database DB can be a BigQuery database.

Advanced and consolidated reports can be computed using a business analytics service BA such as Microsoft Power BI™. The business analytics service BA can run on the decision server DC, or on the security engine system SE, or in any other location. At least a part of the security events or a part of the metadata of the security events stored in the database DB can be sent 180 to the decision business analytics service BA. The result of the said analysis can be compiled in a report, then sent to the stakeholders.

The security engine system SE can comprise a notification server EM configured to send 190 a notification by electronic messaging. Electronic messaging can comprise emails or tickets open on ticketing systems. The notification server EM is preferably a subscriber of the main message broker MB2. This way, each time a security event is send to a subscriber of the main message broker MB2 (such as the decision server DC or the remediation server SE) it can also be sent to the notification server EM. This way, the notification server EM can send a notification to the stakeholders at each steps of the method 100. The notification can, for example, correspond to the security marks of the security action. It allows the stakeholders to get a real time overview of the security processed by the security engine system SE and therefore a real time overview of the security state of the computing resource CR.

The security engine system SE can be deployed using a deployment manager scripts and an application programming interface script to build and configure the environment to support the engine.

The security engine system SE as well as the different element it comprises can be software components, for example implemented using cloud functions.

What is claimed is:

1. A method to remediate a security issue of a computing resource, the method being carried out by a security engine system comprising a transformation module, a main message broker, and a remediation server, the computing resource comprising an anomaly detection service, the security engine system being configured to communicate with the anomaly detection service of the computing resource and a decision server, the method comprising:

determining, using the transformation module, a security event from a description of the security issue,
   wherein the security issue is detected by the anomaly detection service,
   wherein the description of the security issue is compiled by the anomaly detection service,
   wherein said security event is an abstraction layer to the description of the security issue and the security event, wherein the security event comprises a plurality of fields that provide information on a type of the security issue, and wherein the security event is determined by
   embedding the description of the security issue in the security event in its original form,
   converting the description of the security issue into a format that is processable by the decision server by parsing the security issue to fill in the plurality of fields of the security event,
wherein said abstraction layer exchanges information between the computing resource and the decision server, wherein the computing resource is public, private, or hybrid,
   such that remediation of said security issue is extended and is not limited to public computing resources;
sending, to the decision server by the main message broker, the security event to obtain a sequence of recommended remediation actions based on the security event,
   wherein said sequence of recommended remediation actions is determined based on context information associated with the security issue provided to the security event to provide said sequence of recommended remediation actions that fit a needed remediation of the security issue,
   wherein said sequence of recommended remediation actions is generated from a security playbook that comprises use cases or workflows to be executed to investigate the security event and remediate the security issue,
   wherein said security playbook is integrated into a security orchestration automation and response system (SOAR), and
   wherein said sequence of recommended remediation actions comprise at least one or more of
      a disk snapshot to copy an evidence of a threat,
      shutting down a virtual machine;
receiving, from the decision server by the main message broker, the sequence of recommended remediation actions; and,
executing, using the remediation server, remediation scripts,
   wherein the remediation server comprises a script library that the remediation server queries, and wherein the script library comprises at least one script defining at least one script action,
   wherein the remediation server is triggered when the remediation server receives said sequence of recommended remediation actions;
applying said sequence of recommended remediation actions as a whole applied to said computing resource to remediate the security issue,
   wherein said remediation scripts from said script library implement all recommended remediation actions of said sequence of recommended remediation actions from said security playbook,
   wherein each remediation script of said remediation scripts implements at least a remediation action from the sequence of recommended remediation actions, such that each remediation script of said remediation scripts comprises said at least one script action from said script library to apply to the computing resource, wherein when the remediation scripts are executed following said sequence of recommended remediation actions as a whole to remediate the security issue, the security issue is remediated, and the security event indicating remediation is sent to the main message broker, wherein if no remediation script is able to produce a recommended remediation action to remediate the security issue, the security event indicating no remediation is sent to the main message broker;

wherein the main message broker also receives an investigation result from the decision server based on the security event, the investigation result indicating if the security issue is considered as a true positive or a false positive, wherein the remediation scripts are only executed by the remediation server when the investigation result indicates a true positive, and if the investigation result indicates a false positive, the sequence of the recommended remediation actions is empty;

wherein instead of sending one or more of the sequence of recommended remediation actions and the investigation result independently, the decision server enriches the security event as an enriched security event with one or more of the investigation result and the sequence of recommended remediation actions, such that the enriched security event is sent back by the decision server, received by the security engine system, and routed by the main message broker to the remediation server.

2. The method according to claim 1, wherein the sequence of recommended remediation actions is added to the security event.

3. The method according to claim 1, wherein the security event comprises one or more security marks, at least one security mark corresponding to a state of said security event, at least one new security mark being added to the one or more security marks at each step of the method.

4. The method according to claim 1, wherein the security engine system further comprises a database, wherein the security event comprises metadata, wherein the metadata comprises one or more of security marks, the investigation result and the sequence of recommended remediation actions, wherein the method further comprises storing the metadata of the security event in the database.

5. The method according to claim 1, wherein the security engine system further comprises a notification server, wherein the method further comprises sending a notification by electronic messaging using the notification server.

6. A security engine system to remediate a security issue of a computing resource, the security engine system being configured to carry out a method to remediate the security issue of the computing resource, said security engine system comprising:

a computer that executes specific instructions to implement a transformation module;

a main message broker;

a remediation server;

a notification server configured to send a notification by electronic messaging; and a database;

wherein the computing resource comprises an anomaly detection service, wherein the security engine system is configured to communicate with the anomaly detection service of the computing resource and a decision server;

wherein said transformation module is configured to determine a security event from a description of the security issue, wherein the security event comprises metadata, wherein the metadata comprises one or more of security marks, an investigation result or a sequence of recommended remediation actions, wherein the metadata is stored in the database, wherein the security issue is detected by the anomaly detection service, wherein the description of the security issue is compiled by the anomaly detection service, wherein said security event is an abstraction layer to the description of the security issue and the security event, wherein the security event comprises a plurality of fields that provide information on a type of the security issue, and wherein the security event is determined by embedding the description of the security issue in the security event in its original form, converting the description of the security issue into a format that is processable by the decision server by parsing the security issue to fill in the plurality of fields of the security event, wherein said abstraction layer is configured to exchange information between the computing resource and the decision server, wherein the computing resource is public, private, or hybrid, such that remediation of said security issue is extended and is not limited to public computing resources;

wherein the main message broker is configured to send, to the decision server, the security event to obtain a sequence of recommended remediation actions based on the security event, wherein said sequence of recommended remediation actions is determined based on context information associated with the security issue provided to the security event to provide said sequence of recommended remediation actions that fit a needed remediation of the security issue, wherein said sequence of recommended remediation actions is generated from a security playbook that comprises use cases or workflows to be executed to investigate the security event and remediate the security issue, wherein said security playbook is integrated into a security orchestration automation and response system (SOAR), and wherein said sequence of recommended remediation actions comprise at least one or more of a disk snapshot to copy an evidence of a threat, shutting down a virtual machine;

wherein the main message broker is configured to receive, from the decision server, the sequence of recommended remediation actions; and, wherein the remediation server is configured to execute remediation scripts, wherein the remediation server comprises a script library that the remediation server queries, and wherein the script library comprises at least one script defining at least one script action, wherein the remediation server is triggered when the remediation server receives said sequence of recommended remediation actions, wherein said sequence of recommended remediation actions as a whole is applied to said computing resource to remediate the security issue, wherein said remediation scripts from said script library implement all recommended remediation actions of said sequence of recommended remediation actions from said security playbook, wherein each remediation script of said remediation scripts implements at least a remediation action from the sequence of recommended remediation actions, such that each remediation script of said remediation scripts comprises said at least one script action from said script library to apply to the computing resource;

wherein when the remediation scripts are executed following said sequence of recommended remediation actions as a whole to remediate the security issue, the security issue is remediated, and the security event indicating remediation is sent to the main message broker, wherein if no remediation script is able to produce a recommended remediation action to remediate the security issue, the security event indicating no remediation is sent to the main message broker;

wherein the main message broker also receives the investigation result from the decision server based on the security event, the investigation result indicating if the security issue is considered as a true positive or a false positive, wherein the remediation scripts are only executed by the remediation server when the investigation result indicates a true positive, and if the investigation result indicates a false positive, the sequence of the recommended remediation actions is empty;

wherein instead of sending one or more of the sequence of recommended remediation actions and the investigation result independently, the decision server enriches the security event as an enriched security event with one or more of the investigation result and the sequence of recommended remediation actions, such that the enriched security event is sent back by the decision server, received by the security engine system, and routed by the main message broker to the remediation server.

7. A non-transitory computer-readable medium comprising instructions which, when executed by a computer, causes the computer to carry out a method to remediate a security issue of a computing resource, the method being carried out by a security engine system comprising a transformation module, a main message broker, and a remediation server, the computing resource comprising an anomaly detection service, the security engine system being configured to communicate with the anomaly detection service of the computing resource and a decision server, the method comprising:

determining, using the transformation module, a security event from a description of the security issue, wherein the security issue is detected by the anomaly detection service, wherein the description of the security issue is compiled by the anomaly detection service, wherein said security event is an abstraction layer to the description of the security issue and the security event, wherein the security event comprises a plurality of fields that provide information on a type of the security issue, and wherein the security event is determined by embedding the description of the security issue in the security event in its original form, converting the description of the security issue into a format that is processable by the decision server by parsing the security issue to fill in the plurality of fields of the security event, wherein said abstraction layer exchanges information between the computing resource and the decision server, wherein the computing resource is public, private, or hybrid, such that remediation of said security issue is extended and is not limited to public computing resources;

sending, to the decision server by the main message broker, the security event to obtain a sequence of recommended remediation actions based on the security event, wherein said sequence of recommended remediation actions is determined based on context information associated with the security issue provided to the security event to provide said sequence of recommended remediation actions that fit a needed remediation of the security issue, wherein said sequence of recommended remediation actions is generated from a security playbook that comprises use cases or workflows to be executed to investigate the security event and remediate the security issue, wherein said security playbook is integrated into a security orchestration automation and response system (SOAR), and wherein said sequence of recommended remediation actions comprise at least one or more of a disk snapshot to copy an evidence of a threat, shutting down a virtual machine;

receiving, from the decision server by the main message broker, the sequence of recommended remediation actions; and, executing, using the remediation server, remediation scripts, wherein the remediation server comprises a script library that the remediation server queries, and wherein the script library comprises at least one script defining at least one script action, wherein the remediation server is triggered when the remediation server receives said sequence of recommended remediation actions;

applying said sequence of recommended remediation actions as a whole applied to said computing resource to remediate the security issue, wherein said remediation scripts from said script library implement all recommended remediation actions of said sequence of recommended remediation actions from said security playbook, wherein each remediation script of said remediation scripts implements at least a remediation action from the sequence of recommended remediation actions, such that each remediation script of said remediation scripts comprises said at least one script action from said script library to apply to the computing resource, wherein when the remediation scripts are executed following said sequence of recommended remediation actions as a whole to remediate the security issue, the security issue is remediated, and the security event indicating remediation is sent to the main message broker, wherein if no remediation script is able to produce a recommended remediation action to remediate the security issue, the security event indicating no remediation is sent to the main message broker;

wherein the main message broker also receives an investigation result from the decision server based on the security event, the investigation result indicating if the security issue is considered as a true positive or a false positive, wherein the remediation scripts are only executed by the remediation server when the investigation result indicates a true positive, and if the investigation result indicates a false positive, the sequence of the recommended remediation actions is empty;

wherein instead of sending one or more of the sequence of recommended remediation actions and the investigation result independently, the decision server enriches the security event as an enriched security event with one or more of the investigation result and the sequence of recommended remediation actions, such that the enriched security event is sent back by the decision server, received by the security engine system, and routed by the main message broker to the remediation server.

8. The non-transitory computer-readable medium according to claim 7, further comprising a computer program product.

* * * * *